(12) United States Patent
Ferguson et al.

(10) Patent No.: US 12,478,059 B2
(45) Date of Patent: Nov. 25, 2025

(54) TREE PLATFORM SYSTEM

(71) Applicant: SEQUOIA OUTDOORS, LLC, Aurora, OH (US)

(72) Inventors: Shawn Patrick Ferguson, Venetia, PA (US); Nickolas Betts, Pittsburgh, PA (US)

(73) Assignee: SEQUOIA OUTDOORS, LLC, Aurora, OH (US)

( * ) Notice: Subject to any disclaimer, the term of this patent is extended or adjusted under 35 U.S.C. 154(b) by 19 days.

(21) Appl. No.: 18/539,767

(22) Filed: Dec. 14, 2023

(65) Prior Publication Data

US 2024/0196881 A1  Jun. 20, 2024

Related U.S. Application Data

(60) Provisional application No. 63/387,789, filed on Dec. 16, 2022.

(51) Int. Cl.
*A01M 31/02* (2006.01)

(52) U.S. Cl.
CPC .................. *A01M 31/02* (2013.01)

(58) Field of Classification Search
CPC ...................................... A01M 31/02
USPC ................................. 182/133–136
See application file for complete search history.

(56) References Cited

U.S. PATENT DOCUMENTS

| | | | | |
|---|---|---|---|---|
| 5,103,935 A | * | 4/1992 | Amacker | A45F 3/26 182/135 |
| 7,971,685 B2 | * | 7/2011 | Simone | A01M 31/02 182/136 |
| 10,912,293 B1 | * | 2/2021 | Miller | A01M 31/02 |
| 11,154,048 B2 | * | 10/2021 | Power, II | E06C 1/381 |
| 11,602,213 B1 | * | 3/2023 | Leach | A01M 31/02 |
| 2003/0127286 A1 | * | 7/2003 | Engstrom | A01M 31/02 182/136 |
| 2004/0084248 A1 | * | 5/2004 | Burgeson | A01M 31/02 182/116 |
| 2007/0175702 A1 | * | 8/2007 | Simone | A01M 31/02 182/187 |
| 2007/0261919 A1 | * | 11/2007 | Roe | A01M 31/02 182/187 |
| 2012/0175190 A1 | * | 7/2012 | Schlipf | A63B 71/023 182/187 |
| 2014/0008149 A1 | * | 1/2014 | Fogel | A01M 31/02 182/129 |
| 2014/0190767 A1 | * | 7/2014 | Wheelington | A01M 31/02 182/187 |
| 2015/0053503 A1 | * | 2/2015 | Richey | E04G 5/067 182/187 |
| 2017/0027159 A1 | * | 2/2017 | Johnson | A01M 31/02 |

(Continued)

*Primary Examiner* — Christopher D Hutchens
(74) *Attorney, Agent, or Firm* — RANKIN, HILL & CLARK LLP (57) ABSTRACT

A tree platform system includes a post including an upper end and a lower end disposed at opposite ends thereof; and a platform connected to the post near the lower end. The platform includes a primary portion and a secondary portion that cooperate to define a main standing surface for selective receipt of at least one associated foot of an associated user of the tree platform system. The primary portion defines a datum plane and the secondary portion defines a secondary plane. The datum plane and the secondary plane are not coplanar.

19 Claims, 9 Drawing Sheets

(56) References Cited

U.S. PATENT DOCUMENTS

| | | | |
|---|---|---|---|
| 2017/0265454 A1* | 9/2017 | Kramer | A01M 31/02 |
| 2019/0055782 A1* | 2/2019 | Infalt | E06C 1/34 |
| 2020/0253190 A1* | 8/2020 | D'Acquisto | A01M 31/02 |
| 2021/0169067 A1* | 6/2021 | Power, II | F16B 2/08 |
| 2021/0204538 A1* | 7/2021 | Power, II | A01M 31/02 |
| 2023/0255192 A1* | 8/2023 | Walters | A01M 31/02 182/133 |
| 2023/0270101 A1* | 8/2023 | Lovich | A01M 31/02 182/187 |
| 2024/0188558 A1* | 6/2024 | Garcia | A01M 31/02 |

* cited by examiner

TREE PLATFORM SYSTEM

BACKGROUND

Tree platform systems are used across a wide array of applications to provide an elevated position for a user to be located. For example, tree platforms can be used for hunting, scouting, photography, and videography of game. The elevated position aids users in their pursuit of game.

However, if a tree platform has only a single planar top surface for the user to stand upon, there are limited foot placement options available to the user. This will diminish their enjoyment and ease of use of the tree platform system and can also complicate installation of the tree platform system. As such, improvements are needed.

SUMMARY

A tree platform system includes a post including an upper end and a lower end disposed at opposite ends thereof; and a platform connected to the post near the lower end. The platform includes a primary portion and a secondary portion that cooperate to define a main standing surface for selective receipt of at least one associated foot of an associated user of the tree platform system. The primary portion defines a datum plane and the secondary portion defines a secondary plane. The datum plane and the secondary plane are not coplanar.

Alternatively, a tree platform system can include a post including an upper end and a lower end disposed at opposite ends thereof. The post includes a foot pad disposed near the upper end of the post and the foot pad defines an auxiliary standing surface configured to selectively receive at least one associated foot of an associated user of the tree platform system. The tree platform system can also include a platform pivotably connected to the post near the lower end. The platform defines a main standing surface for selective receipt of the at least one associated foot of the associated user of the tree platform system.

DETAILED DESCRIPTION

Figure 1:
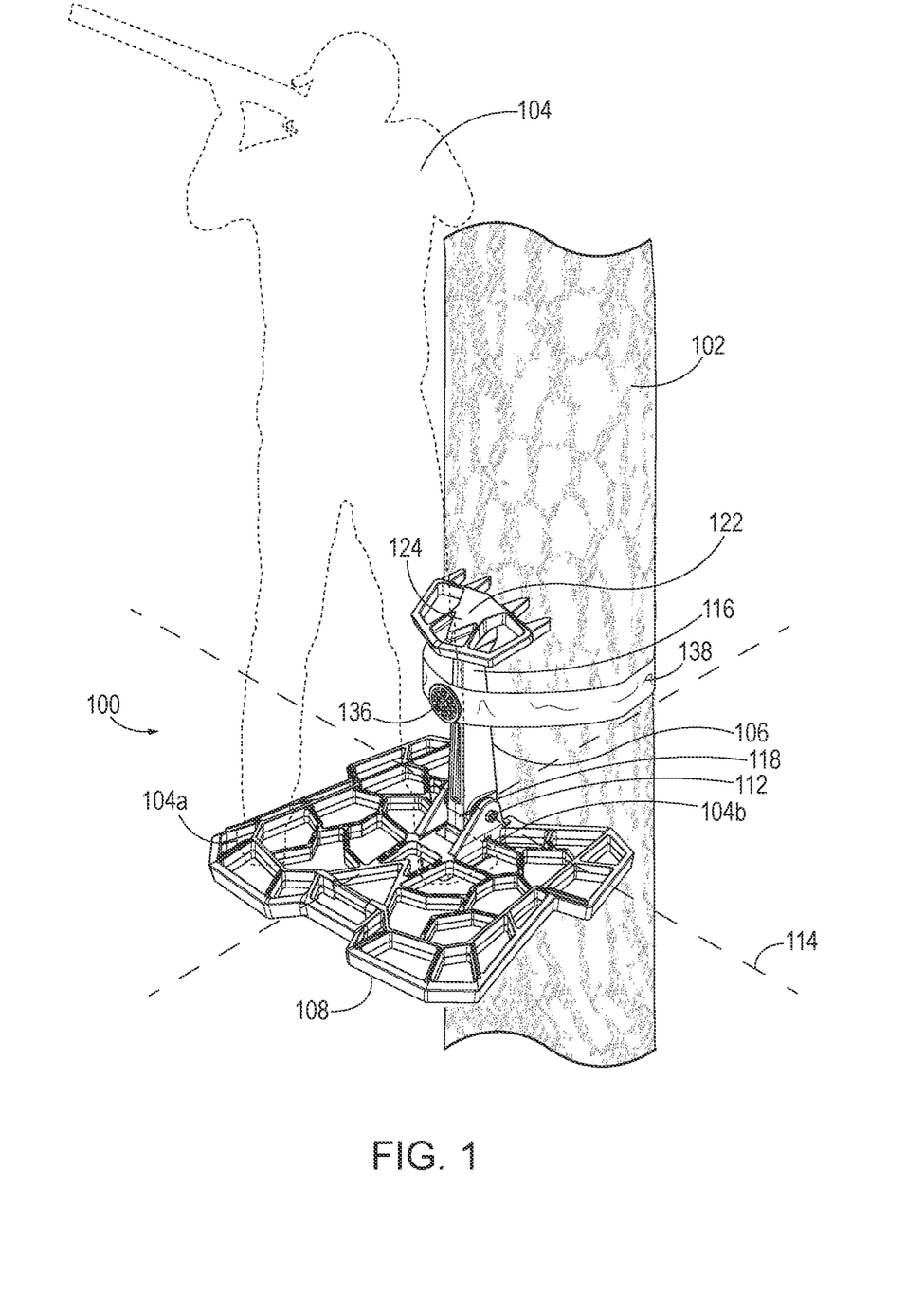
FIG. 1 is a top perspective view of a tree platform system installed on a tree.

With reference to FIG. 1, a tree platform system 100 that can be mounted in an associated tree 102 is shown. The tree platform system 100 can be used by an associated user 104. The associated user 104 can have two feet 104a, 104b. The tree platform system 100 is configured to be secured and removed from the tree 102 with each use.

Figure 9:
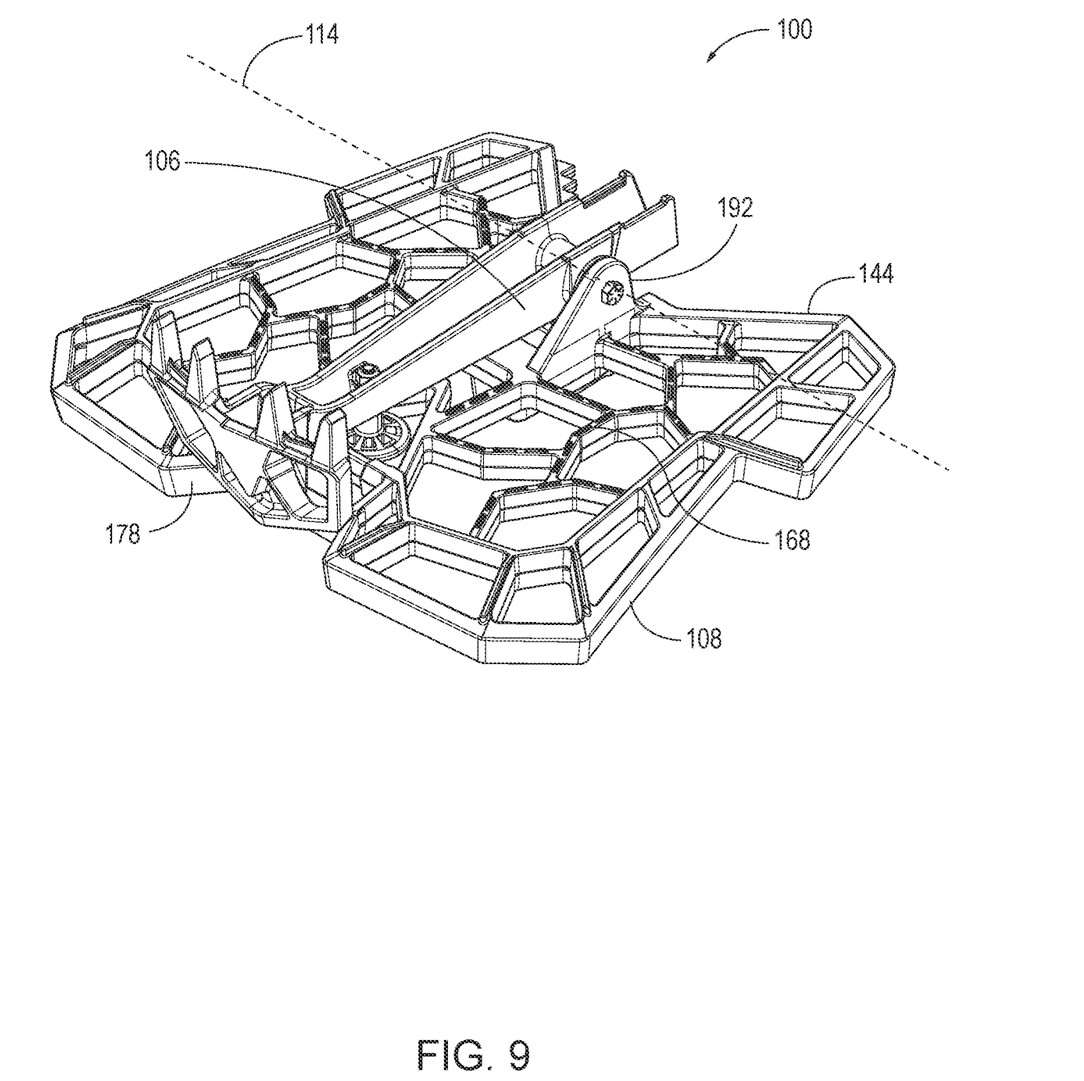
FIG. 9 is a perspective view of the tree platform system in a stowed state.

The tree platform system 100 includes a post 106 and a platform 108 that can be pivotably connected by a pin 112 that defines a pivot axis 114. With continued attention to FIG. 1, the post 106 and the platform 108 can cooperate to define a deployed state when an included angle between the post 106 and the platform 108 about the pivot axis 114 is greater than 45 degrees. As illustrated, the referenced included angle is approximately 90 degrees. Alternatively, as shown in FIG. 9, the post 106 and the platform 108 can cooperate to define a stowed state when an included angle therebetween about the pivot axis 114 is less than 45 degrees.

As will be appreciated, the tree platform system 100 could be in the stowed state to simplify movement of the tree platform system 100 between various locations. Unless otherwise noted, all further descriptions related to relative positions and orientations of the various components of the tree platform system 100 will be when the tree platform system 100 is in the deployed state. As illustrated, the tree platform system 100 is compact and has minimal weight. For example, it is envisioned that the tree platform system 100 could weigh five pounds or less. Further, the platform 108 could be less than 15 inches in length or width. As such, the user 104 could easily carry the tree platform system 100 to the desired location without difficulty.

The post 106 can be made of a variety of materials that provide sufficient strength and rigidity to function in the aforementioned manner. Referring back to FIG. 1, the post 106 can include an upper end 116 and a lower end 118 disposed at opposite ends thereof. When in the deployed state, the post 106 is oriented to extend primarily in a vertical direction, which coincides with the generally vertical direction of which the associated tree 102 extends.

The post 106 can also include a foot pad 122 that can be disposed near the upper end 116 of the post 106. As illustrated, the foot pad 122 is integral to the post 106. Such an arrangement can provide improved strength. The foot pad 122 can include a top side 124 and a bottom side 126 (FIG. 2) that face in opposite directions, with the top side 124 facing upward and the bottom side 126 facing downward. As such, the bottom side 126 would face toward the platform 108 and the top side 124 would face away from the platform 108.

Figure 3:
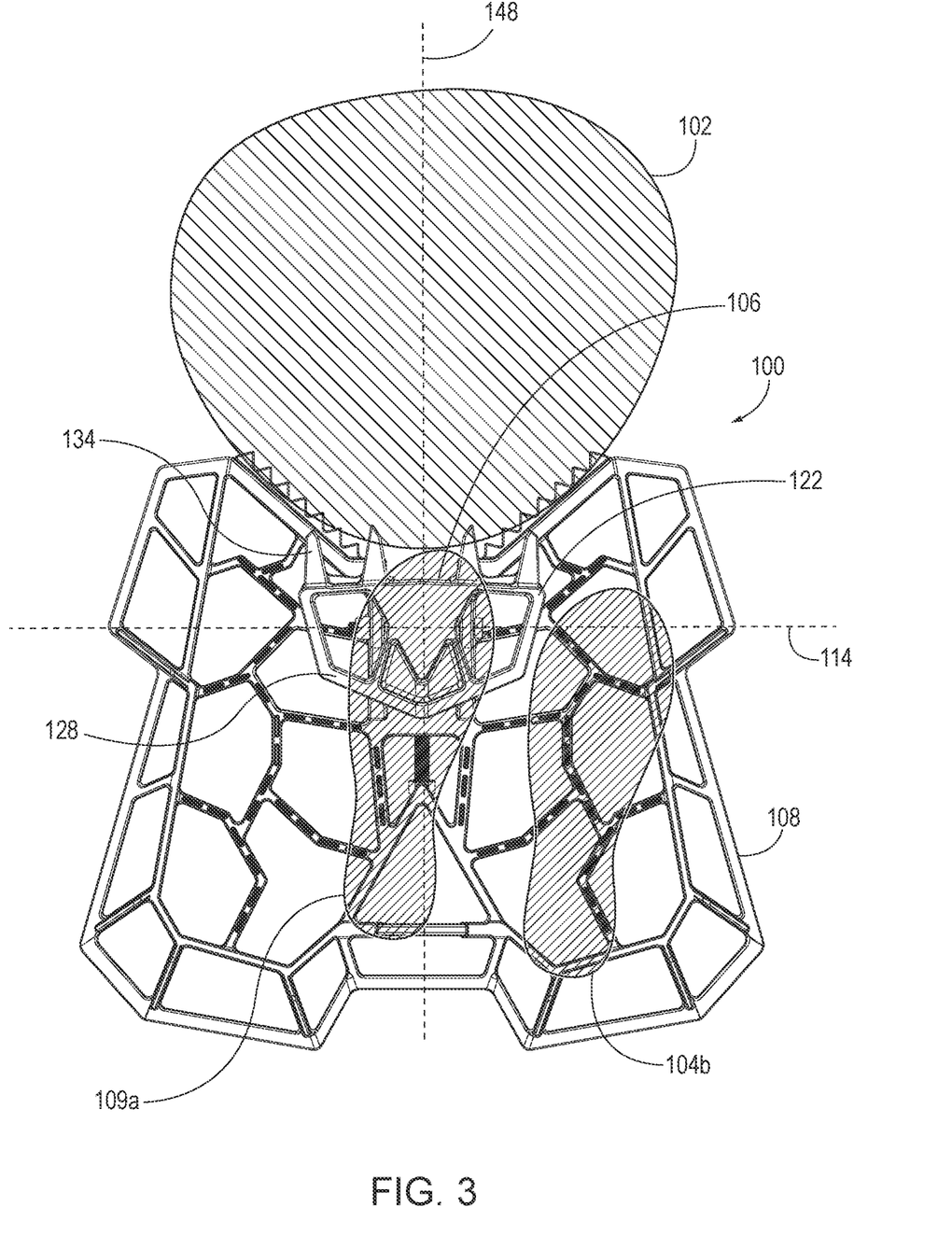
FIG. 3 is a top plan view showing a first foot placement on the tree platform system.

As shown in FIG. 3, the foot pad 122 defines an auxiliary standing surface 128 configured to selectively receive at least one associated foot 104a, 104b of the associated user 104 of the tree platform system 100. The foot pad 122 can have an open frame type construction. This open frame construction allows for reduced weight of the foot pad 122, while still providing an adequate size for the user 104 to comfortably position their foot 104a, 104b thereon.

The foot pad 122 can be configured such that the user 104 can press down upon it when attaching the platform 108 to the tree 102. This allows the user 104 to ensure a safe and secure connection to the tree 102. While the user 104 is on the platform 108, the foot pad 122 offers additional foot placement opportunities for comfort and maneuverability about the platform 108.

Further, the foot pad 122 can provide the user 104 with a greater ability to secure the platform 108 quickly and effectively to the tree 102. The foot pad 122 also allows the user 104 a larger surface area to safely and comfortably secure the platform 108 into position, with the use of downward force from the user's hands 132 or feet 104a, 104b during setup. Finally, the foot pad 122 can provide an elevated position to rest a foot 104a, 104b while in use and provides additional footing when maneuvering around the platform 108 and/or taking a shot at wild game.

The post 106 can also include a cleat 134 that selectively engages the associated tree 102. Further, the foot pad 122 can be disposed near the upper end 116 of the post 106 such that the cleat 134 extends from the foot pad 122 to engage the associated tree 102. As will be appreciated, the cleat 134 can provide engagement between the post 106, and hence the tree platform system 100, and the associated tree 102. The engagement helps to ensure that the tree platform system 100 remains securely attached to the associated tree 102. Since the cleat 134 extends from the foot pad 122, a more compact, yet sturdy method of connection to the associated tree 102 is provided.

Figure 2:
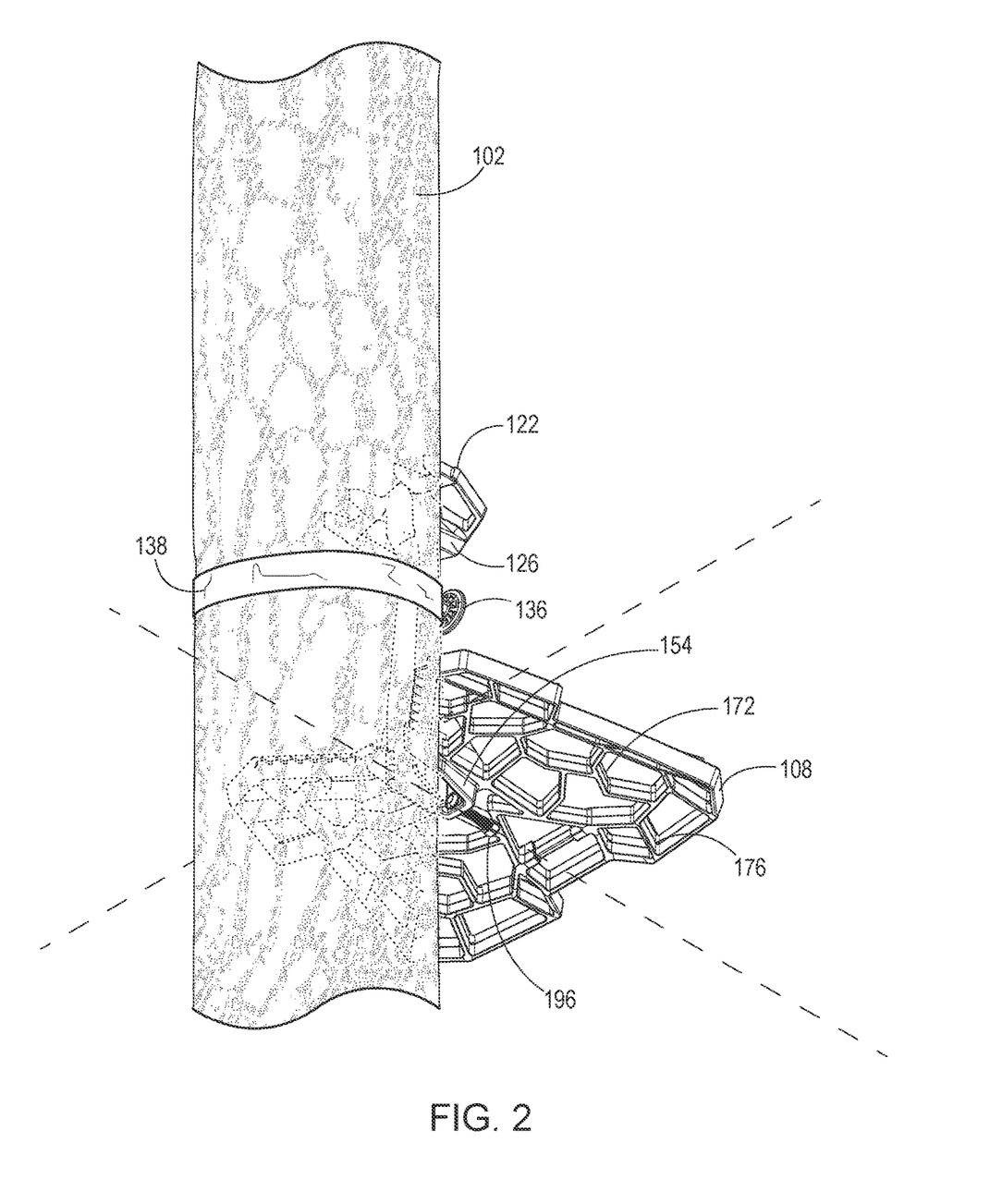
FIG. 2 is a bottom perspective view of the tree platform system installed on the tree.

As shown in FIGS. 1 and 2, the post 106 can also include a button 136 that aids in attachment of the tree platform system 100 to the associated tree 102. As illustrated, the button 136 is located approximately one-third of the way down the post 106 from the foot pad 122. The user 104 can engage the button 136 with a strap 138 for connection to the associated tree 102. Such an arrangement helps to provide for a secure connection between the tree platform system 100 and the associated tree 102.

Figure 4:
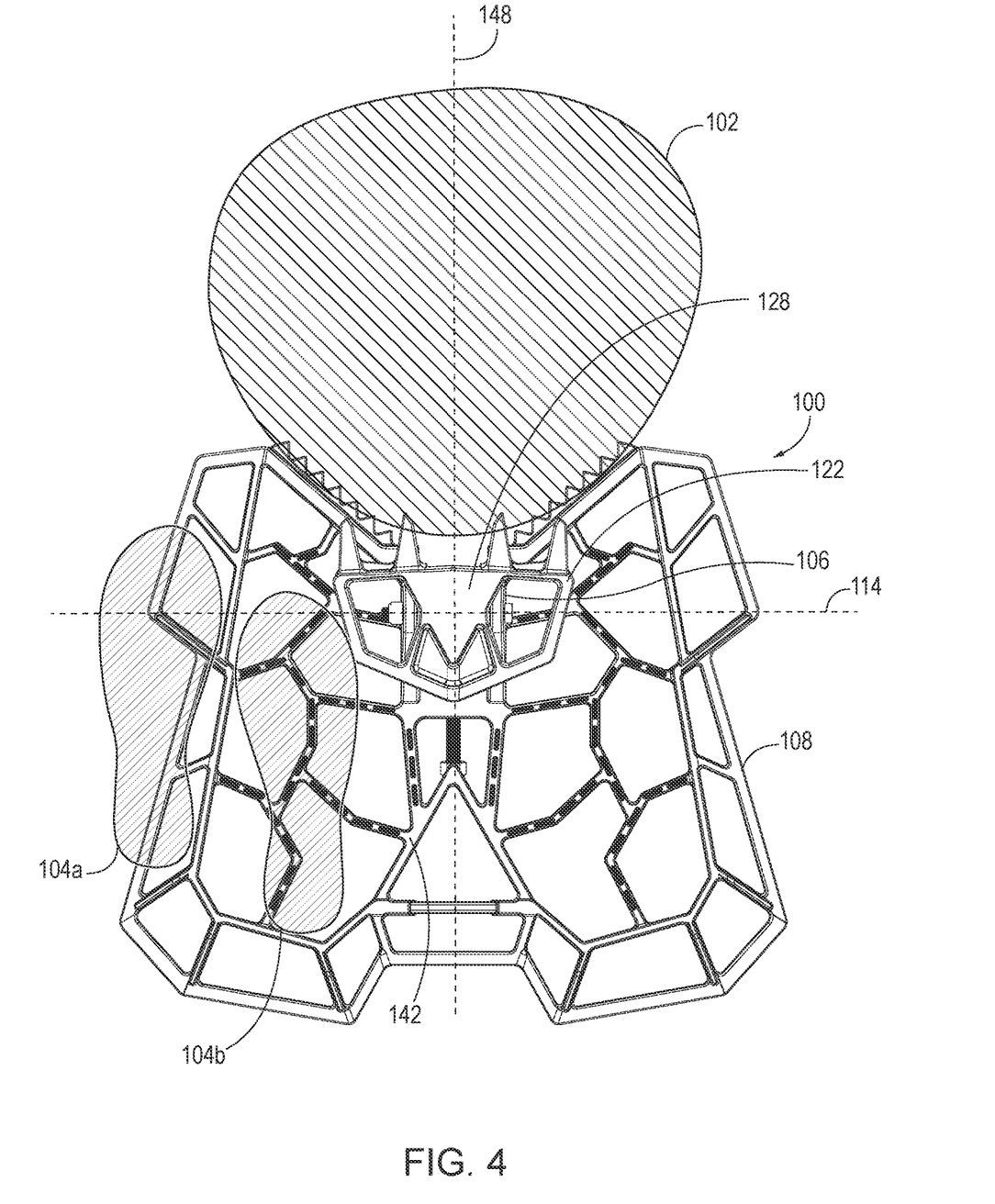
FIG. 4 is a top plan view showing a second foot placement on the tree platform system.

As noted hereinbefore, the tree platform system 100 includes the platform 108 that is connected to the post 106 near the lower end 118 of the post 106. The platform 108 can be made of a variety of materials that provide sufficient strength and rigidity to function in the aforementioned manner. With reference to FIG. 4, in a plan view, the platform 108 can have a generally rectangular shape. Like the foot pad 122, the platform 108 can be made of an open frame construction. Such an arrangement allows for reduced weight while still providing sufficient strength for use by the user 104.

The platform 108 defines a main standing surface 142 for selective receipt of the at least one associated foot 104a, 104b of the associated user 104 of the tree platform system 100. It is envisioned that the user 104 could place one foot on the platform 108, as the main standing surface 142, for support and one foot on the foot pad 122, as the auxiliary standing surface 128 as shown in FIG. 3. Alternatively, the user 104 could simultaneously place both feet 104a, 104b on the platform 108 as shown in FIGS. 4 and 5.

Figure 5:
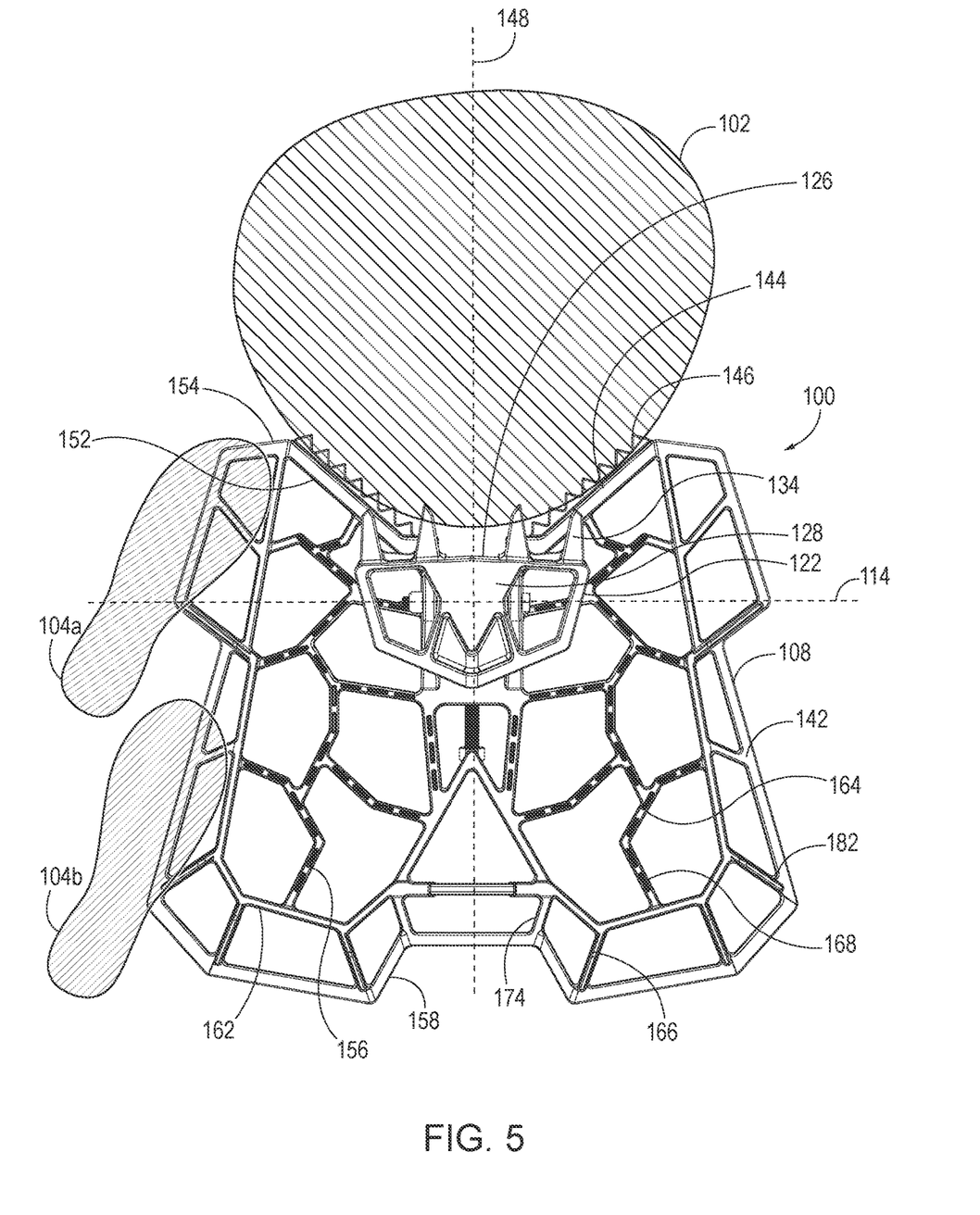
FIG. 5 is a top plan view showing a third foot placement on the tree platform system.
Figure 6:
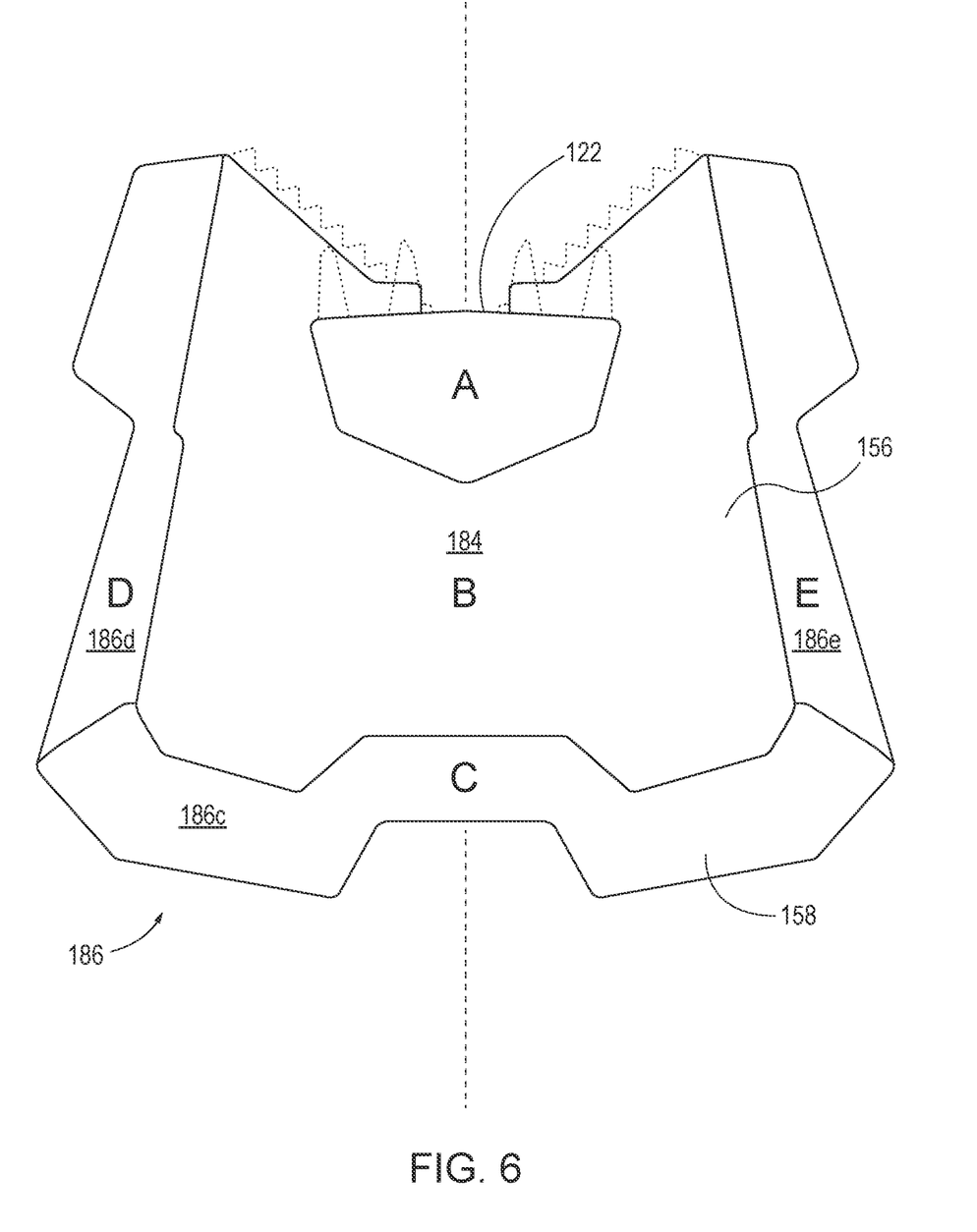
FIG. 6 is a top plan view in schematic form showing various planes of the tree platform system.

The ability to alternate between having one foot 104a, 104b versus both feet 104a, 104b on the platform 108 as shown between FIGS. 3-5 provides numerous advantages to the user 104. For example, the user 104 is afforded greater comfort with the ability to alternate positions. Further, the user 104 is provided with enhanced viewing opportunities, thereby allowing for the improved viewing of surrounding areas. The enhanced viewing opportunities can also provide the user 104 with enhanced shot opportunities of game when used for hunting purposes.

With reference to FIG. 5, the platform 108 can also define a tree channel 144 for receipt of the associated tree 102. The platform 108 can also include a plurality of teeth 146 for selective engagement with the associated tree 102 so as to define an engagement axis 148. Similar to the cleat 134, the teeth 146 can provide engagement between the platform 108, and hence the tree platform system 100, and the associated tree 102. The engagement helps to ensure that the tree platform system 100 remains securely attached to the associated tree 102.

The platform 108 can also include a border wall 152 that cooperates with the tree channel 144 to define a perimeter 154 of the platform 108. The associated tree 102 is received in the tree channel 144 such that the plurality of teeth 146 contact the associated tree 102 and prevent movement of the tree platform system 100 in a direction generally orthogonal to the engagement axis 148.

The platform 108 can include a primary portion 156 and a secondary portion 158. The primary portion 156 and the secondary portion 158 cooperate to define the main standing surface 142 for selective receipt of at least one associated foot 104a, 104b of the associated user 104 of the tree platform system 100. The primary portion 156 and the secondary portion 158 can be adjacent one another. Further, the pivot axis 114 passes through the secondary portion 158 in a plan view of the tree platform system 10. Such an arrangement provides for improved usage of the tree platform system 10 by allowing the user to more easily move about the platform 108.

Figure 7:
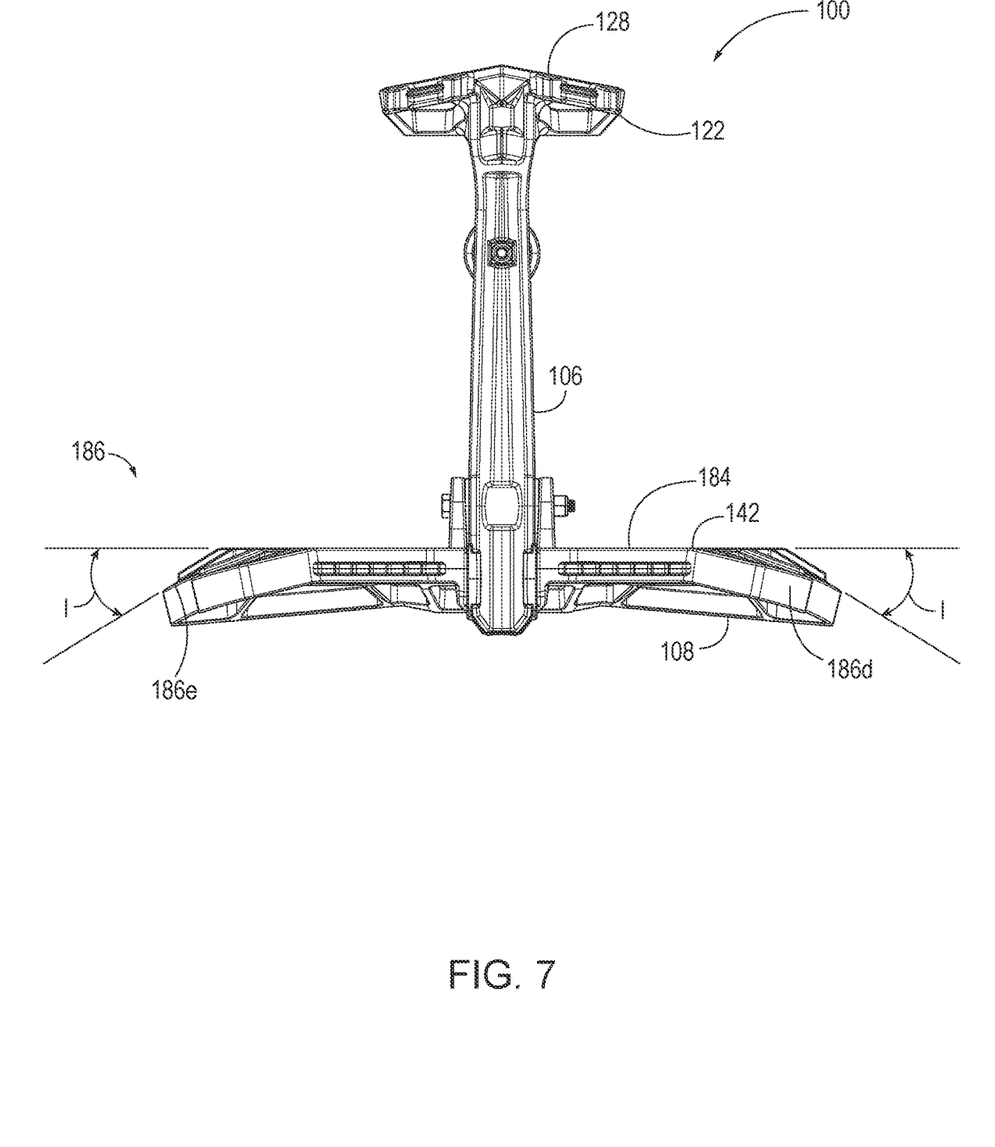
FIG. 7 is a rear elevation view of the tree platform system.
Figure 8:
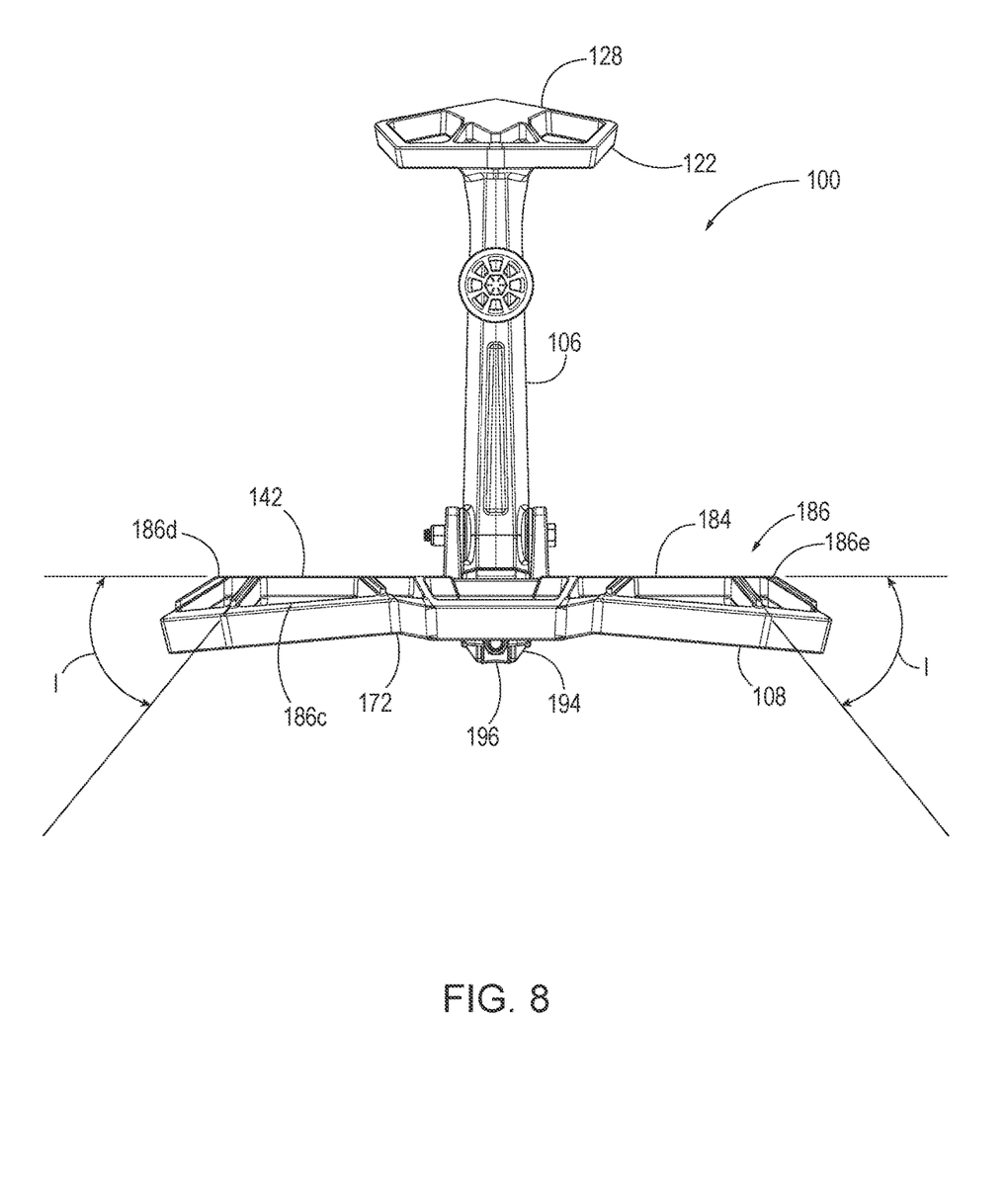
FIG. 8 is a front elevation view of the tree platform system.

As shown in FIGS. 7 and 8, the auxiliary standing surface 128 of the foot pad 122 is vertically spaced from the main standing surface 142 of the platform 108. Thus, the foot pad 122 is spaced from the platform 108.

Referring back to FIG. 5, the primary portion 156 can include a boundary wall 162 that defines a perimeter of the primary portion 156 so as to delineate between the primary portion 156 and the secondary portion 158. The boundary wall 162 can be vertically spaced in the direction generally orthogonal to the engagement axis 148 from the upper end 116 of the post 106 a distance that is less than a distance that the border wall 152 is vertically spaced in the direction generally orthogonal to the engagement axis 148 from the upper end 116 of the post 106.

The primary portion 156 can include a plurality of primary ribs 164 and the secondary portion 158 can include a plurality of secondary ribs 166. The primary ribs 164 can each include a top face 168 that faces upward and a bottom face 172 (FIG. 2) that faces downward. The plurality of secondary ribs 166 can include a top surface 174 that faces upward and a bottom surface 176 (FIG. 2) that faces downward.

As will be appreciated, the described orientations of the top face 168, the bottom face 172, the top surface 174, and the bottom surface 176 are when the tree platform system 100 is in the deployed state. As illustrated, the top faces 168 of the plurality of primary ribs 164 and the top surfaces 174 of the secondary ribs 166 are configured to receive the at least one associated foot 104a, 104b of the associated user 104 of the tree platform system 100. Further, as shown in FIG. 9, the secondary portion 158 can define a foot pad channel 178 that is configured to slidingly accept the foot pad 122 when the tree platform system 100 is in the stowed state.

Referring back to FIG. 5, at least some of the plurality of secondary ribs 166 can include a ridge grip 182 that extends from the respective top surface 174 in a direction away from the respective bottom surface 176. Therefore, a distance between the top surface 174 and the bottom surface 176 of the secondary ribs 166 that include the ridge grip 182 is greater than a distance between the top surface 174 and the bottom surface 176 of the secondary ribs 166 that do not include the ridge grip 182. The ridge grip 182 can improve the experience of the user 104 of the tree platform system 100. For example, the user 104 may feel that they have improved traction while standing on the platform 108. This is especially beneficial in inclement weather.

With reference to FIGS. 5-8, the primary portion 156 defines a datum plane 184 and the secondary portion 158 defines a secondary plane 186. More particularly, the top faces 168 of the plurality of the primary ribs 164 of the primary portion 156 cooperate to define the datum plane 184 and the top surfaces 174 of the plurality of the secondary ribs 166 of the secondary portion 158 cooperate to define the secondary plane 186. It is noted that the secondary portion 158 is disposed around a perimeter 188 of the primary portion 156. As such, there can be a plurality of sections of the secondary portion 158. Each of these sections can define a unique secondary plane 186C, 186D, 186E. It will be understood that there could be more or less sections of the secondary plane 186 without departing from the scope of the disclosure.

Nevertheless, each of the unique secondary planes 186 are not coplanar with the datum plane 184. An included angle I between the datum plane 184 and any section of the individual secondary plane 186 can be at least fifteen degrees and no more than thirty-five degrees. More specifically, the included angle I between the datum plane 184 and any of the sections of the secondary plane 186 can be at least eighteen degrees and no more than thirty degrees. This arrangement not only decreases foot fatigue/discomfort, but allows for a more natural footing when maneuvering around the platform 108.

As shown in FIG. 9, the platform 108 can also include a post hub 192. The post hub 192 can upwardly extend from the top face 168 of the platform 108, nearest the tree channel 144, to receive the post 106 in a manner that it can be rotated vertically for use and horizontally when not in use, relative to the top face 168. As shown in FIGS. 2 and 8, the bottom face 172 of the platform 108 can include a leveling bolt hub 194 that extends downward from the bottom face 172, nearest the tree channel 144. The leveling bolt hub 194 can be configured to receive a leveling bolt 196. The leveling bolt 196 can engage the lower end 118 of the post 106 when in use on the tree 102. This leveling bolt 196 is configured to allow for adjustment by the user 104 to accommodate a wide range of trees for safe use.

A tree platform system been described above with particularity. Modifications and alterations will occur to those upon reading and understanding the preceding detailed description. The invention, however, is not limited to only the embodiments described above. Instead, the invention is broadly defined by the appended claims and the equivalents thereof.

The invention claimed is:

1. A tree platform system, comprising:
 a post including an upper end and a lower end disposed at opposite ends thereof;
 a platform connected to the post near the lower end, the platform including a primary portion and a secondary portion that cooperate to define a main standing surface for selective receipt of at least one associated foot of an associated user of the tree platform system, wherein the primary portion defines a datum plane and the secondary portion defines a secondary plane, and wherein the datum plane and the secondary plane are not coplanar; and
 a pin that pivotably connects the post and the platform so as to define a pivot axis, wherein the pivot axis passes through the secondary portion in a plan view of the tree platform system, wherein the secondary portion slopes downwardly when extending away from the primary portion.

2. The tree platform system of claim 1, wherein the post and the platform cooperate to define a deployed state when an included angle therebetween about the pivot axis is greater than 45 degrees and a stowed state when an included angle therebetween about the pivot axis is less than 45 degrees, and wherein the post includes a foot pad that defines an auxiliary standing surface configured to selectively receive the at least one associated foot of the associated user of the tree platform system.

3. The tree platform system of claim 2, wherein the auxiliary standing surface of the foot pad is vertically spaced from the main standing surface of the platform when the tree platform system is in the deployed state.

4. The tree platform system of claim 2, wherein the post includes a cleat that selectively engages an associated tree and the foot pad is disposed near the upper end of the post such that the cleat extends from the foot pad to engage the associated tree.

5. The tree platform system of claim 2, wherein the secondary portion defines a foot pad channel that is configured to slidingly accept the foot pad when the tree platform system is in the stowed state.

6. The tree platform of claim 1, wherein the post and the platform cooperate to define a deployed state when an included angle therebetween is greater than 45 degrees and a stowed state when an included angle therebetween is less than 45 degrees, the platform defining a tree channel including a plurality of teeth for engagement with the associated tree so as to define an engagement axis, and wherein receipt of the associated tree in the tree channel such that the plurality of teeth contact the associated tree prevents movement of the tree platform system in a direction generally orthogonal to the engagement axis.

7. The tree platform system of claim 6, the secondary portion including a border wall that cooperates with the tree channel to define a perimeter of the platform, and wherein the primary portion includes a boundary wall that defines a perimeter of the primary portion so as to delineate between the primary portion and the secondary portion.

8. The tree platform system of claim 7, wherein when in the deployed state, the boundary wall is vertically spaced in the direction generally orthogonal to the engagement axis from the upper end of the post a distance that is less than a distance that the border wall is vertically spaced in the direction generally orthogonal to the engagement axis from the upper end of the post.

9. The tree platform system of claim 1, wherein the post and the platform cooperate to define a deployed state when an included angle therebetween is greater than 45 degrees and a stowed state when an included angle therebetween is less than 45 degrees, the primary portion and the secondary portion being adjacent one another, wherein the primary portion include a top face that faces upward and a bottom face that faces downward and the secondary portion includes a top surface that faces upward and a bottom surface that faces downward when in the deployed state, and wherein the top face of the primary portion and the upper surface of the secondary portion cooperate to define the main standing surface of the platform.

10. The tree platform system of claim 1, wherein the primary portion includes a plurality of primary ribs and the secondary portion includes a plurality of secondary ribs, the plurality of primary ribs each including a top face and the plurality of secondary ribs each including a top surface, and wherein the top faces of the plurality of primary ribs and the top surfaces of the secondary ribs are configured to receive the at least one associated foot of the associated user of the tree platform system.

11. The tree platform system of claim 1, wherein the primary portion includes a plurality of primary ribs and the secondary portion includes a plurality of secondary ribs, the plurality of primary ribs each including a top face and the plurality of secondary ribs each including a top surface, and wherein the top faces of the plurality of the primary ribs of the primary portion cooperating to define the datum plane and the top surfaces of the plurality of secondary ribs of the secondary portion cooperating to define the secondary plane.

12. The tree platform system of claim 11, wherein an included angle between the datum plane and the secondary plane is at least fifteen degrees and no more than thirty-five degrees.

13. The tree platform system of claim 11, wherein an included angle between the datum plane and the secondary plane is at least eighteen degrees and no more than thirty degrees.

14. The tree platform system of claim 11, wherein at least some of the plurality of secondary ribs include a ridge grip that extends from the respective top surface in a direction away from the respective bottom surface such that a distance between the top surface and the bottom surface of the secondary ribs that include the ridge grip is greater than a distance between the top surface and the bottom surface of the secondary ribs that do not include the ridge grip.

15. The tree platform system of claim 1, wherein the secondary portion includes a plurality of sections, and wherein each of the sections defines a unique secondary plane that is not coplanar with the datum plane.

16. The tree platform system of claim of 1, the tree platform defining a lateral direction that is generally parallel to the pivot axis in the plan view and a longitudinal axis that is generally perpendicular to the pivot axis in the plan view, the post defining a vertical axis when extending between the platform and the upper end, wherein the secondary portion is spaced from the upper end a vertical distance that is greater than a vertical distance that the primary portion is spaced from the upper end.

17. A tree platform system, comprising:
a post including an upper end and a lower end disposed at opposite ends thereof; and
a platform pivotably connected to the post near the lower end, the platform including a primary portion including a boundary wall and a secondary portion including a border wall, the primary portion and the secondary portion cooperating to define a main standing surface for selective receipt of the at least one associated foot of the associated user of the tree platform system, the secondary portion slopes downwardly when extending away from the primary portion, the platform defining a tree channel including a plurality of teeth for engagement with an associated tree so as to define an engagement axis, wherein receipt of the associated tree in the tree channel such that the plurality of teeth contact the associated tree prevents movement of the tree platform system in a direction generally orthogonal to the engagement axis, the border wall cooperating with the tree channel to define a perimeter of the platform and the boundary wall defines a perimeter of the primary portion so as to delineate between the primary portion and the secondary portion, wherein the post and the platform cooperate to define a deployed state when an included angle therebetween is greater than 45 degrees and a stowed state when an included angle therebetween is less than 45 degrees, and wherein when in the deployed state, the boundary wall is vertically spaced in a direction generally orthogonal to the engagement axis from the upper end of the post a distance that is less than a distance that the border wall is vertically spaced in the direction generally orthogonal to the engagement axis from the upper end of the post.

18. The tree platform system of claim 17, the post including a foot pad disposed near the upper end of the post, the foot pad defining an auxiliary standing surface configured to selectively receive at least one associated foot of an associated user of the tree platform system, wherein the foot pad is spaced from the platform when in the deployed state.

19. The tree platform system of claim 17, the post including a foot pad disposed near the upper end of the post, the foot pad defining an auxiliary standing surface configured to selectively receive at least one associated foot of an associated user of the tree platform system, wherein the foot pad includes a top side and a bottom side that face in opposite directions, wherein in the deployed state, the top side faces away from the main standing surface and the bottom side faces toward the main standing surface and wherein the post includes a cleat that extends from the foot pad to selectively engage an associated tree.

* * * * *